US010483846B1

(12) United States Patent
Allegrini et al.

(10) Patent No.: US 10,483,846 B1
(45) Date of Patent: Nov. 19, 2019

(54) MULTI-MODE CHARGE PUMP

(71) Applicant: Allegro MicroSystems, LLC, Manchester, NH (US)

(72) Inventors: Gianluca Allegrini, Musselburgh (GB); Thomas Ross, Livingston (GB); James McIntosh, Longniddry (GB)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/426,444

(22) Filed: May 30, 2019

(51) Int. Cl.
*H02M 3/07* (2006.01)
*H02J 7/00* (2006.01)

(52) U.S. Cl.
CPC ........... *H02M 3/073* (2013.01); *H02J 7/0065* (2013.01); *H02M 2003/072* (2013.01)

(58) Field of Classification Search
IPC ...................... H02M 3/07,2001/009, 2003/071, 2003/072
See application file for complete search history.

(56) References Cited

U.S. PATENT DOCUMENTS

| 6,984,967 | B2 | 1/2006 | Notman | |
|---|---|---|---|---|
| 7,626,445 | B2* | 12/2009 | Lesso | H02M 3/07 327/535 |
| 9,291,478 | B2 | 3/2016 | Contaldo et al. | |
| 2007/0146051 | A1* | 6/2007 | Tsen | H02M 3/07 327/536 |
| 2010/0277152 | A1* | 11/2010 | MacFarlane | H02M 3/07 323/288 |
| 2011/0204961 | A1* | 8/2011 | Galal | H02M 3/07 327/536 |
| 2017/0054363 | A1 | 2/2017 | Mangtani et al. | |
| 2017/0279348 | A1* | 9/2017 | Kulkarni | H03K 5/19 |
| 2017/0310213 | A1* | 10/2017 | Crandall | H02M 3/07 |

* cited by examiner

*Primary Examiner* — Adam D Houston
(74) *Attorney, Agent, or Firm* — Daly, Crowley, Mofford & Durkee, LLP

(57) ABSTRACT

A multi-mode charge pump generates a regulated voltage at an output node from a battery input voltage. The multi-mode charge pump has a plurality of flying capacitors and a plurality of switches coupled to the flying capacitors in order to selectively couple the flying capacitors to the battery, the output node or a reference potential. The regulated voltage is provided across a storage capacitor coupled to the flying capacitors, and the regulated voltage is input to a comparator. The comparator also receives a reference voltage and compares the regulated voltage to the reference voltage to generates an asynchronous regulation signal. A controller in the multi-mode charge pump can automatically transition between operation modes such as a buck mode, a doubler mode and a tripler mode by controlling actuation of the switches in response to the asynchronous regulation signal and clock signals.

20 Claims, 5 Drawing Sheets

MULTI-MODE CHARGE PUMP

BACKGROUND

Charge pumps are used in a variety of applications to boost a voltage from an input voltage source to a higher level to meet system requirements. Some charge pumps are used in low voltage systems and thus, have modest voltage boosting requirements. Other charge pumps are used in high voltage systems in which it can be more challenging to boost an input voltage to a level that is sufficient to meet the system requirements, particularly in applications in which the input voltage source is a relatively low voltage battery.

One example charge pump application is in motor control circuits to boost an input voltage to a level sufficient to drive a high side switch. For example, a charge pump capacitor can be charged to a level to generate a gate drive signal at a level sufficiently higher than the high side switch source terminal in order to turn on the high side switch.

Conventional charge pumps often require user input to change a circuit configuration and/or operational mode. The reliance on external circuits and/or inputs can, increase the cost, and/or adversely impact the efficient and accurate operation of such charge pumps.

SUMMARY

A multi-mode charge pump is envisioned that can operate in high voltage systems in an automated fashion, have minimal capacitor depletion, and can be powered from one or more relatively low voltage batteries. Implemented within the multi-mode charge pump is a relatively simple ESD scheme that can be used to reduce or eliminate residual electrostatic energy within the circuit. The multi-mode charge pump can automatically and smoothly transition between multiple operational modes, such as a buck mode, a doubler mode and a tripler mode, based on an asynchronous regulation signal. Transitioning automatically between the various operational modes without requiring user input or intervention permits the multi-mode charge pump to efficiently and effectively generate a regulated target voltage.

Described herein is a multi-mode charge pump for generating a regulated voltage at an output node from a battery input voltage source. The multi-mode charge pump includes a plurality of flying capacitors and a plurality of switches, each coupled to at least one of the flying capacitors. The plurality of switches can be configured to selectively couple the flying capacitors to the battery, the output node, or a reference potential. Further included in the multi-mode charge pump is a storage capacitor that can be selectively coupled to one or more of the flying capacitors. The regulated voltage can be provided across the storage capacitor and coupled to a first input of a comparator. The comparator has a second input that is coupled to a reference voltage, and an output that provides an asynchronous regulation signal. The multi-mode charge pump can further include a controller that is configured to automatically transition between operational modes of the multi-mode charge pump by controlling actuation of the plurality of switches in response to the asynchronous regulation signal. The operational mode can be selected from a buck mode, a doubler mode, and a tripler mode.

The charge pump may include one or more of the following features. In some instances, the buck mode of the multi-mode charge pump can include an idle state and a pump state, while both the doubler mode and the tripler mode can include a charge state and a pump state. The controller of the multi-mode charge pump can include a state machine that has a plurality of states that correspond to the idle state of the buck mode, the pump state of the buck mode, the charge state of the doubler mode, the pump state of the doubler mode, the charge state of the tripler mode, the pump state of the tripler mode, and a dead time between the operational modes.

The multi-mode charge pump can include two non-overlapping clock signals that are coupled to the controller. The controller can be further configured to control actuation of the plurality of switches in response to the non-overlapping clock signals. A first one of the non-overlapping clock signals can cause the state machine to enter a charge state, while a second one of the non-overlapping clock signals can cause the state machine to enter a pump state. In some instances, the state machine can be configured to prevent the operational mode from changing directly from the buck mode to the tripler mode, and also to prevent the operational mode from changing directly from the tripler mode to the buck mode.

A level of the regulated voltage of the multi-mode charge pump can be based in part on a load current of a load coupled to receive the regulated voltage and a level of a voltage of the battery.

The multi-mode charge pump can further include a current limited current source that is coupled to a first switch of the plurality of switches and to the battery. When the multi-mode charge pump is in the buck mode, the controller is configured to actuate the first switch to route current from the battery to the output node.

In some embodiments, during a charge state of the doubler mode of the multi-mode charge pump, the controller can actuate the plurality of switches to couple a first plate of each of the flying capacitors to the battery and to the output node and to couple a second plate of each of the flying capacitors to the reference potential. During a pump state of the doubler mode, the controller can actuate the plurality of switches to couple a first plate of each of the flying capacitors to the battery and to the output node and to couple a second plate of at least one of the flying capacitors to the battery.

In other embodiments, during a charge state of the tripler mode of the multi-mode charge pump, the controller can actuate the plurality of switches to couple a first plate of each of the flying capacitors to the battery and to the output node and to couple a second plate of a first one of the flying capacitors to the battery. During a pump state of the tripler mode, the controller can actuate the plurality of switches to couple a first plate of each of the flying capacitors to the battery and to the output node and to couple a second plate of a second one of the flying capacitors to the battery. In these embodiments, the first flying capacitor can be different from the second flying capacitor. In some instances, a plate of each of the flying capacitors can be coupled to the reference potential at least once during each operational mode.

Also described herein is a method or means for generating a regulated voltage at an output node from a battery input voltage source. This method can include coupling, by a plurality of switches in a multi-mode charge pump, one or more of a plurality of flying capacitors to the battery, the output node or a reference potential and providing a regulated voltage across a storage capacitor that is coupled to at least one of the flying capacitors. The method can include receiving, by a comparator, the regulated voltage at a first input coupled to the storage capacitor, and outputting, by the comparator, an asynchronous signal generated by comparing the regulated voltage to a reference voltage coupled to a second input of the comparator. Additionally the method can include receiving, by a controller, the asynchronous signal, and actuating, by the controller in response to the asynchronous signal, the plurality of switches to transition between operational modes of the multi-mode charge pump. The operational mode can be selected from a buck mode, a doubler mode, and a tripler mode.

Still further described herein is a multi-mode charge pump for generating a regulated voltage at an output node from a battery. The multi-mode charge pump can include a means for coupling one or more of a plurality of flying capacitors to the battery, the output node or a reference potential, and a means for providing the regulated voltage across a storage capacitor coupled to at least one of the flying capacitors. The multi-mode charge pump can also include a means for comparing the regulated voltage to a reference voltage to generate an asynchronous signal, and a means for selectively actuating the coupling means to cause the multi-mode charge pump to transition between operational modes selected from a buck mode, a doubler mode, and a tripler mode in response to the asynchronous signal.

BRIEF DESCRIPTION OF THE DRAWINGS

The foregoing and other objects, features and advantages will be apparent from the following more particular description of the embodiments and the appended claims, as illustrated in the accompanying drawings in which like reference characters refer to the same parts throughout the detailed description. Reference characters introduced in a figure may be repeated in one or more subsequent figures without additional description in the detailed description in order to provide context for other features of the described embodiments.

DETAILED DESCRIPTION

An automated, multi-mode charge pump can generate a regulated target output voltage when the supply voltage and/or load vary. This multi-mode charge pump can include one or more switched capacitors that can be selectively coupled to the supply voltage and/or to a reference potential when one or more switches are actuated. The switches are actuated based on a two phase, dual clock system and an asynchronous regulation signal related to an overvoltage determination in order to cause the charge pump to transition between a buck mode, a doubler mode, and a tripler mode of operation.

Figure 1:
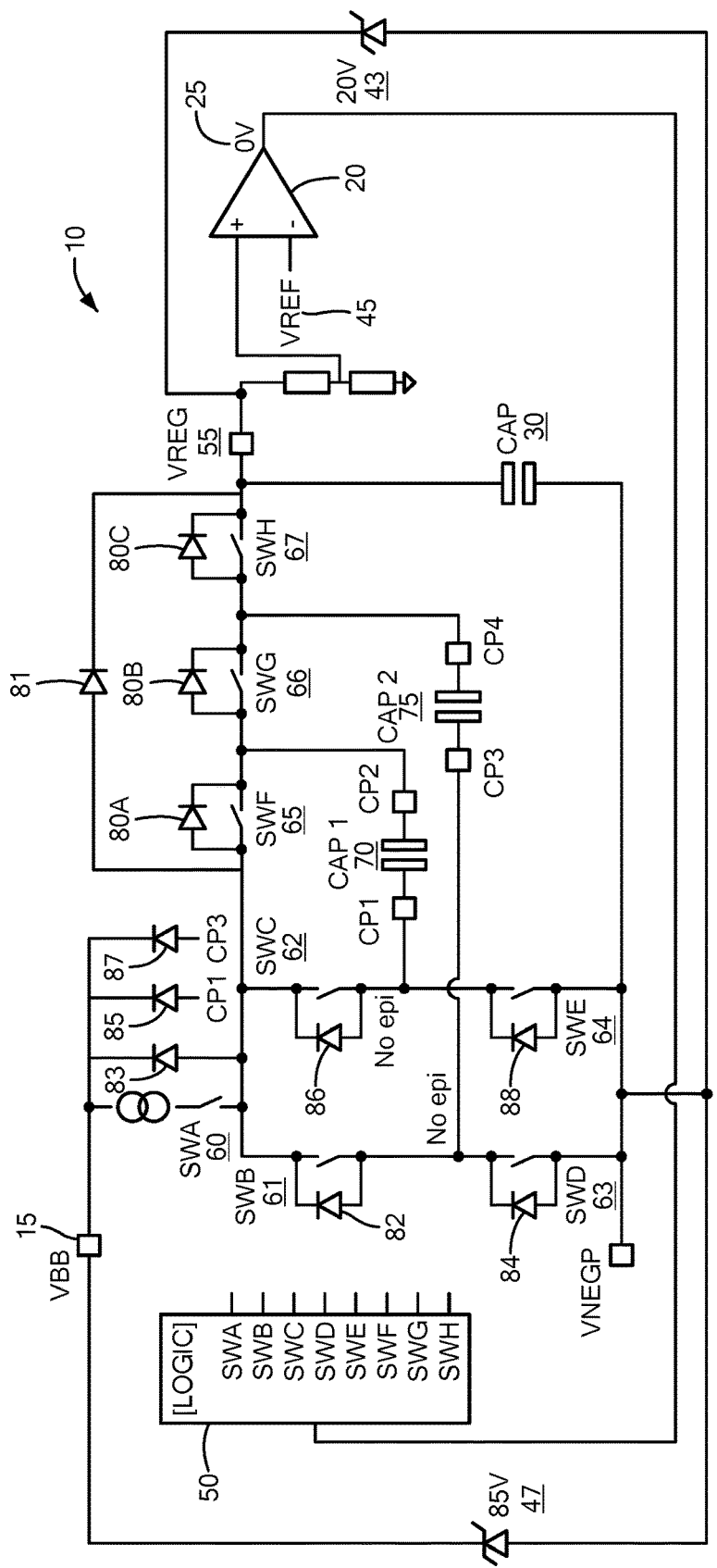
FIG. 1 illustrates a circuit diagram depicting an embodiment of an automated, multi-mode charge pump.

Illustrated in FIG. 1 is an embodiment of an automated, multi-mode charge pump 10, also referred to herein as the charge pump, the multi-mode charge pump and the circuit. The multi-mode charge pump 10 receives a battery voltage or more generally a supply voltage ("VBB") 15 and has an output node at which a regulated voltage ("VREG") 55 is provided.

Charge pump 10 can include a plurality of flying capacitors, here two such capacitors ("CAP1") 70 and ("CAP2") 75, and at least one storage capacitor ("CAP3") 30 across which the regulated voltage VREG is provided. A plurality of switches including: switch A ("SWA") 60, switch B ("SWB") 61, switch C ("SWC") 62, switch D ("SWD") 63, switch E ("SWE") 64, switch F ("SWF") 65, switch G ("SWG") 66 and switch H ("SWH") 67 are configured to selectively couple the flying capacitors 70, 75 to the battery 15, to the output node 55 and/or to a reference potential, such as VNEGP. It will be appreciated that in some applications, VNEGP may be at a ground potential and in other applications, VNEGP may be a varying voltage. For example, in a motor driver application, in which the regulated voltage VREG is used to generate a high side switch gate drive signal, VNEGP may vary between ground and the battery voltage 15. For simplicity, the VNEGP potential will be referred to herein as ground.

A comparator 20 can receive as inputs the regulated voltage 55 (or divided version of the regulated voltage, as shown) and a reference voltage ("VREF") 45, and upon comparing the two values, output an asynchronous regulation signal 25. Aspects of the charge pump 10 can be controlled by a controller 50 that can receive the regulation signal 25 from the comparator 20. In some instances, the controller 50 can control actuation of the switches 60-67. In embodiments, switches 60-67 can be provided in the form of Field Effect Transistors (FETs), each having a body diode, as shown. For example: SWB 61 is associated with a diode 82; SWC 62 is associated with a diode 86; SWD 63 is associated with a diode 84; SWE 64 is associated with a diode 88; SWF 65 is associated with a diode 80A; SWG 66 is associated with a diode 80B; and SWH 67 is associated with a diode 80C.

In some embodiments, the supply voltage VBB 15 is provided by a battery (not shown in FIG. 1). In some instances, the charge pump 10 can be designed to operate with a battery voltage VBB 15 of between approximately 4.5 volts and 50 volts.

The charge pump 10 can be designed to provide a regulated voltage, VREG 55. This regulated voltage VREG 55 can be referred to as a target voltage, regulated voltage or the output voltage. The multi-mode charge pump 10 can be configured to maintain the regulated voltage 55 within a certain range of voltage values. In some instances, this range can include a single target voltage, such as 13 volts above the VNEGP reference potential. In other instances, the range can be defined by a target voltage with a tolerance of plus or minus a predetermined percent. It should be appreciated that the charge pump 10 can maintain the regulated voltage 55 to be any target voltage, or a value within a range of target voltage values. As one non-limiting example, the described charge pump 10 is designed for applications in which the supply voltage 15 is provided by a battery having a nominal voltage on the order of between 4 and 50 volts and the desired target voltage needs to be sufficient to drive high side switches in a motor driver where the switch drive signal is required to be between approximately 8-13 volts above the switch source terminal, which switch source terminal can fly between ground and the battery voltage level.

An aspect of the electrostatic discharge ("ESD") limitation scheme of the charge pump 10 can include diodes 83, 85 and 87 as shown, each switch's body diode, and a first Zener diode 43 that has a breakdown voltage of 20 volts, and a second Zener diode 47 that has a breakdown voltage of 85 volts. Each switch's body diode 80A-C, 82, 84, 86 can provide a path to the first Zener diode 43 via VREG 55. When the voltage at VREG 55 exceeds the breakdown voltage of the first Zener diode 43, i.e. exceeds twenty (20) volts, the current is routed to ground. Similarly, diodes 83, 85 and 87 provide a path to the second Zener diode 47 via VBB 15. When the voltage at VBB 15 exceeds the breakdown voltage of the second Zener diode 47, i.e. exceeds eighty-five (85) volts, the current is routed to ground. Simplifying the ESD limitation scheme using this simple circuit architecture permits a low-cost implementation of ESD limitation or elimination.

Comparator 20 can receive the regulated voltage 55 and compare it to the reference voltage 45. The comparator can be any electrical component capable of comparing voltages and outputting a value 25 representative of the comparison. In the charge pump 10, the comparator 20 can compare a divided version of the regulated voltage 55 to the reference voltage 45 and output a regulation signal 25 representative of the comparison. It should be understood that a so-called "comparator" can be comprised of an analog comparator having a two-state output signal indicative of an input signal being above or below a threshold level (or indicative of one input signal being above or below another input signal). However the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

The regulation signal 25 can be a logic signal, at a first, logic high level when the regulated voltage 55 is greater than the reference voltage 45 and at a second, logic low level when the regulated voltage is less than the reference voltage. In other instances, the regulation signal 25 can be any signal type that has different amplitudes to indicate the level of the regulated voltage 55 relative to the reference voltage 45. The reference voltage 45 can be more generally referred to as a threshold voltage. The regulation signal 25 can be referred to as an overvoltage ("OV") signal, an OV signal, the comparator 20 output value or signal, or an asynchronous regulation signal.

Each of the switches 60, 61, 62, 63, 64, 65, 66, 67 within the charge pump 10 can be controlled by the controller 50. The controller 50 can be a microcontroller, microprocessor, processor, a combination of logic gates or any other element capable of processing code or a set of instructions to carry out an algorithmic process. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. A processor can contain internal processors or internal modules that perform portions of the function, operation, or sequence of operations of the processor. Similarly, a module can contain internal processors or internal modules that perform portions of the function, operation, or sequence of operations of the module.

The controller 50 has output terminals corresponding to each switch 60, 61, 62, 63, 64, 65, 66, 67, and the controller 50 controls actuation of the switches by outputting a control signal such as a high voltage value or a low voltage value. This control signal can be referred to as a switch control signal.

The controller 50 can further include two or more clocks (not shown). These clocks can be referred to herein as clock 1 and clock 2. Both clocks can be embedded within the controller 50 such that operation of the clocks is carried out within hardware and/or software within the controller 50. In other embodiments, the clocks can be external clocks, oscillators or counters connected to the controller 50. Clock 1 and clock 2 can have non-overlapping time periods such as those illustrated in FIG. 3.

Determining when to actuate each switch 60, 61, 62, 63, 64, 65, 66, 67 can be based in part clock 1 and clock 2, and the asynchronous regulation signal 25. The controller 50 uses the value of clock 1, the value of clock 2 and the overvoltage signal 25 to generate a multi-bit code which is used to determine the voltage output at each of the controller's terminals connected to a switch. Controlling actuation of the switches further allows the controller 50 to control the operational mode of the charge pump 10 by controlling the coupling of the flying capacitors 70, 75 as will be explained.

One or more of the switches 60, 61, 62, 63, 64, 65, 66, 67 can be a high-speed analog switch such as a FET that uses double-diffusion, metal-oxide semiconductor (DMOS) silicon gate technology. For example, switch D (SWD) 63 and switch E (SWE) 64 can be DMOS-based transistor switches. In other instances, one or more switches can be a FET that uses P-type, metal-oxide semiconductor (PMOS) silicon gate technology. For example, switch B (SWB) 61, switch C (SWC) 62, switch F (SWF) 65, switch G (SWG) 66 and switch H (SWH) 67 can be PMOS-based transistor switches.

Figure 4:
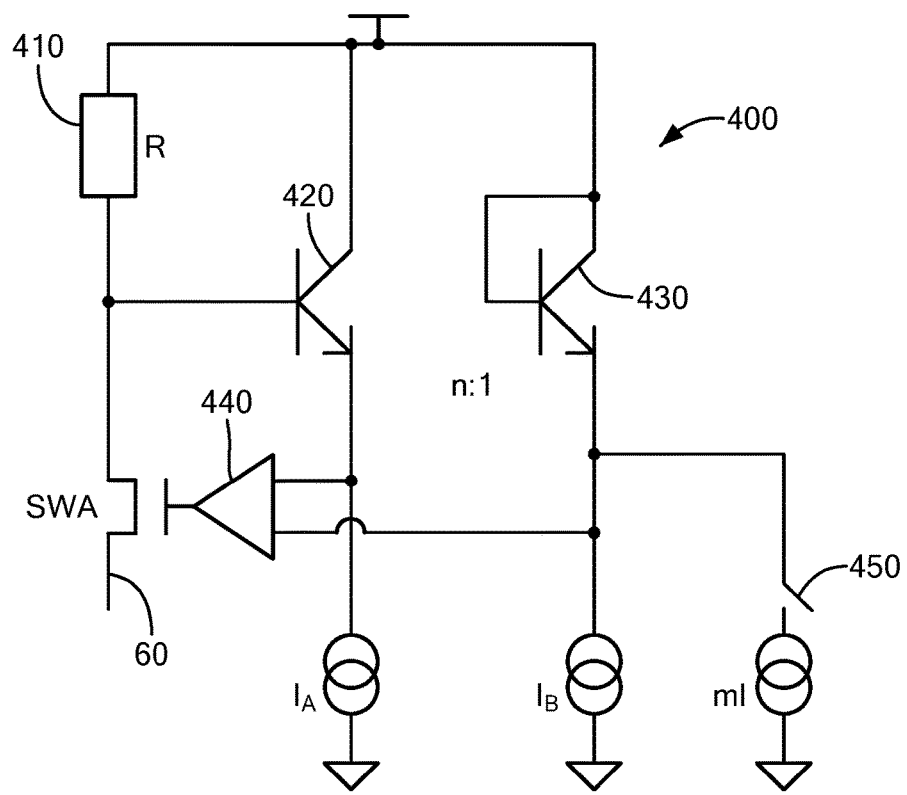
FIG. 4 illustrates a circuit diagram of a current source.

Switch A (SWA) 60, in some embodiments, can be a current controlled PMOS switch that provides a current source, as illustrated in FIG. 4. In some instances, the charge pump 10 is configured such that SWA 60 is the largest switch in the circuit, and such that the voltage drop across SWA 60 can be equal to ten times the current across the load, times the resistance, ($10 \times I_{Load} \times$Resistance).

Storage capacitor 30 can be referred to as the output storage capacitor or CAP3 30 and in operation is selectively coupled to the flying capacitors, i.e. CAP1 70 and CAP2 75, to provide the regulated voltage VREG at the level necessary to supply a load (not shown) coupled to receive the regulated voltage 55. The storage capacitor 30 can be any capacitor capable of storing voltage, potential or charge generated by the charge pump 10. A bottom plate of the storage capacitor 30 can be tied to a reference potential, VNEGP or ground.

Flying capacitors, or CAP1 70 and CAP2 75, can be any type of capacitor capable of being selectively coupled to the supply voltage 15, to the VREG output node 55 and/or to VNEGP or ground in order to change the mode of the charge pump 10.

Figure 2A:
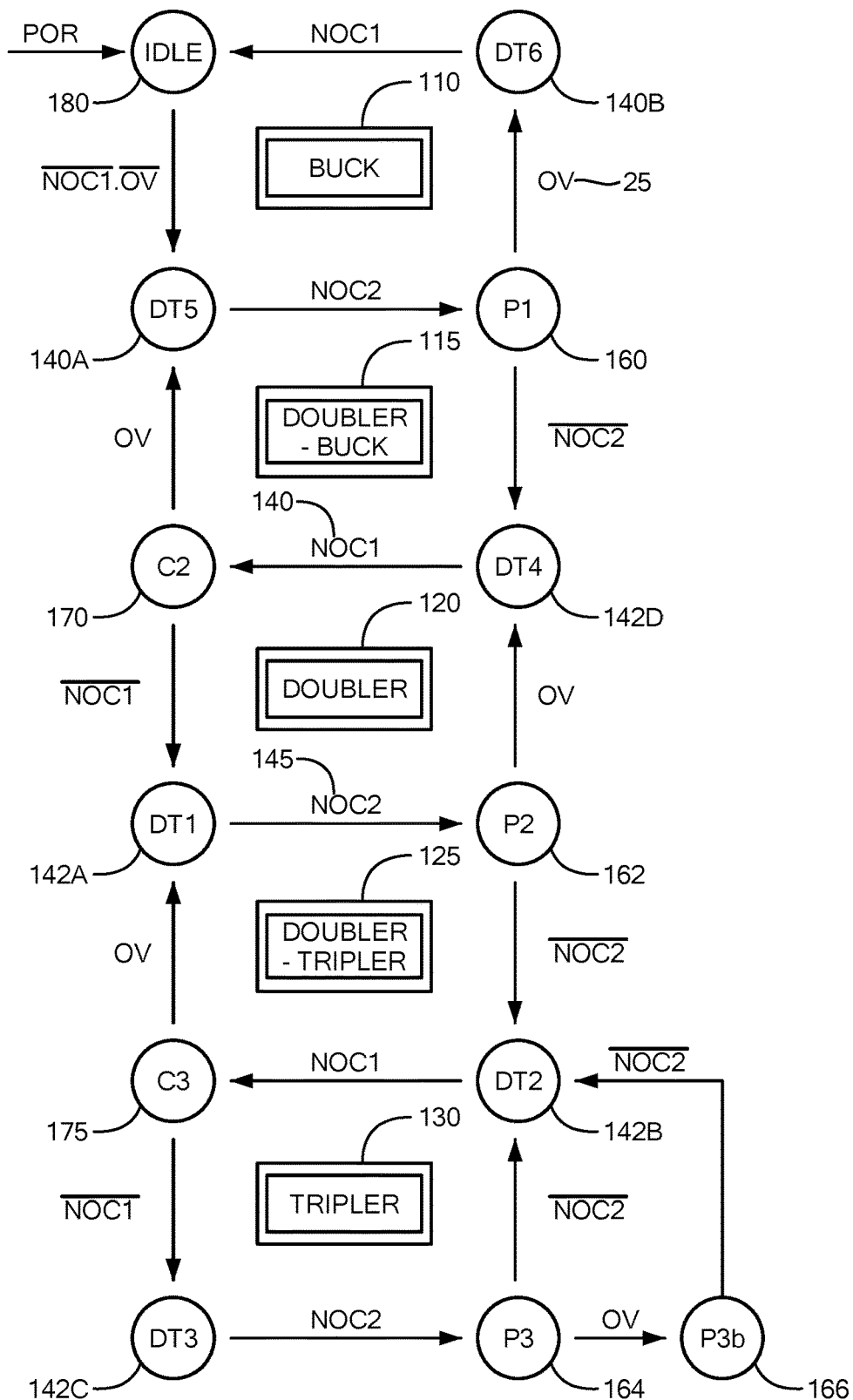
FIGS. 2A-2C illustrate a state diagram and associated circuit diagrams which depict the various states of an embodiment of an automated, multi-mode charge pump.

Illustrated in FIG. 2A is a state diagram for the multi-mode charge pump 10. Shown in FIG. 2A are the various modes and states of operation for the charge pump 10, while FIGS. 2B and 2C demonstrate the configuration of the charge pump 10 (i.e., the switch states) during each operational mode and state and thus, the current path(s) within the charge pump 10. Movement through the various states can be triggered by any combination of a signal from clock 1 (NOC1) 140, a signal from clock 2 (NOC2) 145 or the overvoltage regulation signal (OV) 25. As the charge pump 10 transitions between states of idle, charging, pumping, and dead time, the charge pump 10 also transitions between operational modes such as the buck mode 110, the doubler-buck mode 115, the doubler mode 120, the doubler-tripler mode 125, and the tripler mode 130.

Each mode of operation can have various states associated therewith such as a charging state, a pumping state, a dead time state, or an idle state. It should be appreciated that the various states of the operational modes can be referred to as portions, periods or stages of a mode. During the buck mode 110 (which can commence in response to a Power On Reset (POR) or powering on the circuit), the charge pump 10 can operate to perform DC to DC conversion and maintain regulated voltage 55. In the buck mode 110, the charge pump 10 can generate the regulated voltage 55 at a level lower than the supply voltage 15. The buck mode 110 can include an idle state 180 during which the regulated voltage 55 is generated by PWM control of the current source, and a pumping state (P1) 160 during which voltage or potential on the flying capacitors is offloaded or pumped onto the storage capacitor 30, as well as one or more dead time states, i.e. DT6 140B and DT5 140A.

The doubler-buck mode 115 is a transition period between the buck mode 110 and the doubler mode 120. During the doubler-buck mode 115 one or more dead time states are observed, i.e. DT5 140A and DT4 142D. While FIG. 2A illustrates the doubler-buck mode 115 as a separate mode, in other instances, the various states within this mode can be incorporated in either the buck mode 110 or the doubler mode 120.

While in the doubler mode 120, the charge pump 10 generates the regulated voltage 55 at a level of approximately two times the supply voltage 15. The doubler mode 120 can include the charging state (C2) 170 during which one or more of the flying capacitors 70, 75 are connected to the supply voltage 15 and charged. Further included in the doubler mode 120 is a pumping state (P2) 162, as well as one or more dead time states, i.e. DT4 142D and DT1 142A. When in a pumping state, the charge pump 10 dumps or otherwise transfers charge from one or more of the flying capacitors 70, 75 to the storage capacitor 30.

The doubler-tripler mode 125 is a transition period between the doubler mode 120 and the tripler mode 130. One or more dead time states are observed during the doubler-tripler mode 125, i.e. DT1 142A and DT2 142B. While FIG. 2A illustrates the doubler-tripler mode 125 as a separate mode, in other instances, the various states within this mode can be incorporated in either the doubler mode 120 or the tripler mode 130.

While in the tripler mode 130, the charge pump 10 generates the regulated voltage 55 at a level of approximately three times the supply voltage 15. The tripler mode 130 can include a charging state (C3) 175 during which one or more of the flying capacitors 70, 75 are connected to the supply voltage 15 and charged. Further included in the tripler mode 130 is a first pumping state (P3) 164 and a second pumping state (P3$b$) 166 as well as one or more dead time states, i.e. DT3 142C and DT2 142B. During the first pumping state (P3) 164, one of the flying capacitors (CAP1) 70 dumps or transfers its voltage onto the other flying capacitor (CAP2) 75. The other capacitor (CAP2) 75 then transfers its voltage to the storage capacitor 30.

It should be noted that there are advantages to moving the multi-mode charge pump 10 from the buck mode 110 to the doubler mode 120 and then the tripler mode 130, rather than moving the charge pump 10 directly from the buck mode 110 to the tripler mode 130. The transitory loops, or transition periods of the doubler-buck 115 and the doubler-tripler 125 permit a smooth transition between states which minimizes an amount of ripple experienced by the regulated output voltage 55.

During a transition from one state to another or one mode to another, one or more dead times 140A-B, 142A-D can occur. Dead times are periods of time between states of an operational mode when the charge pump 10 is neither pumping nor charging, but rather in a steady state of inactivity such that the charge pump 10 can be considered "off". In some embodiments, switches that were closed or actuated during a state prior to a dead time period can be actuated again to open. For example, the switches closed during a state such as the pumping state 160 in the buck mode 110 (i.e. SWA, SWD, SWE, SWF) can be opened when the charge pump 10 enters DT6 140B or DT4 142D. Dead times can be called rest periods, transition periods, dead time states or dead time stages.

It should be appreciated that dead times 140A-B, 142A-D can last for a single clock cycle (i.e. a single cycle of clock 1 or clock 2), or more than one clock cycle. In other embodiments, the dead time can last for a predetermined amount of time that corresponds to portions of a clock cycle. In still other embodiments the dead times can last for an undetermined amount of time until an event such as the actuation of a switch or a change in the regulation signal occurs.

Dead time periods can be implemented in between actuation of the plurality of switches to prevent cross-conduction, or as shoot through current. Cross-conduction can generate large current spikes, excessive noise, excessive heat and transistor failure. In some instances, cross-conduction events can cause the charge pump 10 to enter a dead time state early or prematurely.

Figure 2B:
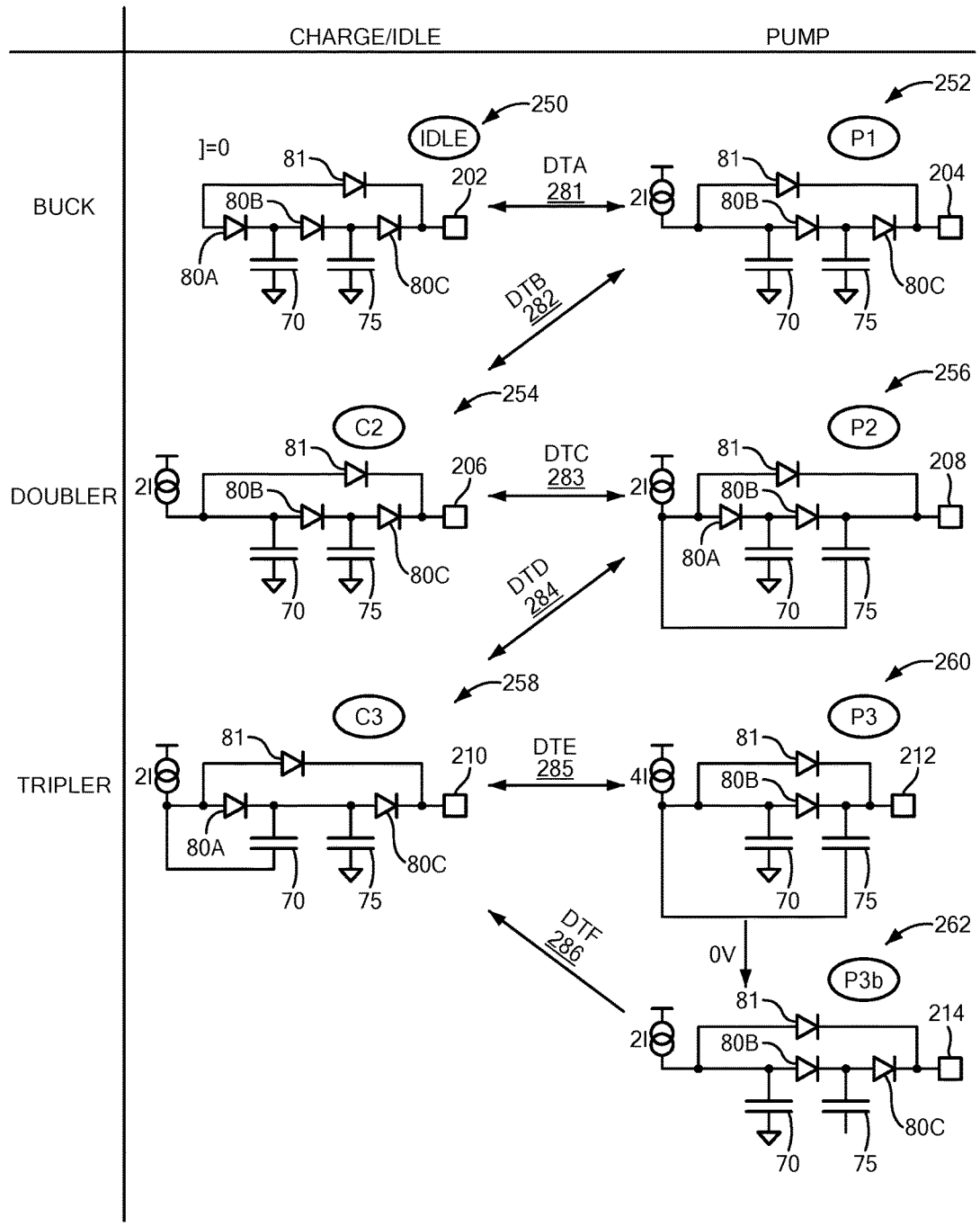

FIG. 2B illustrates the configuration of and thus, the current path through the charge pump 10 circuit during a state of an operating mode. As previously discussed, the controller 50 actuates one or more of the plurality of switches in the charge pump 10 to change the charge pump's operational modes and states. Diodes in FIG. 2B indicated that the respective switch is off (i.e., open). Changing between a buck mode 110, doubler mode 120 and tripler mode 130, and between idle, charging and pumping states, requires selective actuation of the plurality of switches by the controller 50. Upon actuation of one or more switches, the path of the current through the charge pump 10 changes.

Each state and mode illustrated in FIG. 2A corresponds to a circuit diagram in FIG. 2B. For example, when the charge pump 10 is in buck mode 110 and is in the idle state 180, current flows along the path shown in the circuit diagram 250 labeled "Idle" (hereinafter the "Idle Circuit Diagram"). When the charge pump 10 is in buck mode 110 and is in a pumping state 160, current flows along the path shown in the circuit diagram 252 labeled "P1" (hereinafter the "P1 Circuit Diagram"). When the charge pump 10 is in doubler mode 120 and is in a charging state 170, current flows along the path shown in the circuit diagram 254 labeled "C2" (hereinafter the "C2 Circuit Diagram"). When the charge pump 10 is in doubler mode 120 and is in a pumping state 162, current flows along the path shown in the circuit diagram 256 labeled "P2" (hereinafter the "P2 Circuit Diagram"). When the charge pump 10 is in tripler mode 130 and is in a charging state 175, current flows along the path shown in the circuit diagram 258 labeled "C3" (hereinafter the "C3 Circuit Diagram"). When the charge pump 10 is in tripler mode 130 and is in a first pumping state 164, current flows along the path shown in the circuit diagram 260 labeled "P3" (hereinafter the "P3 Circuit Diagram"). When the charge pump 10 is in tripler mode 130 and is in a second pumping state 166, current flows along the path shown in the circuit diagram 262 labeled "P3b" (hereinafter the "P3b Circuit Diagram").

The controller 50 can actuate switches to transition the charge pump 10 between modes and states using a multi-bit code. In some instance, this code can correspond to the different switches such that a "1" represents a command to close the switch and a "0" represents a command to keep the switch open. Table 1, shown below, includes a listing of the various modes and states, the associated circuit diagram, the switches closed to achieve the mode/state, and an exemplary multi-bit code used by the controller 50 to actuate the relevant switches.

TABLE 1

| Mode/State | Switches Closed | Multi-bit Code | Corresponding Circuit Diagram |
|---|---|---|---|
| Buck/Idle | SWD, SWE | 0001_1000 | Idle Circuit Diagram |
| Buck/Pump | SWA, SWD, SWE, SWF | 1001_1100 | P1 Circuit Diagram |
| Doubler/Charge | SWA, SWD, SWE, SWF | 1001_1100 | C2 Circuit Diagram |
| Doubler/Pump | SWA, SWB, SWE, SWH | 1100_1001 | P2 Circuit Diagram |
| Tripler/Charge | SWA, SWC, SWD, SWG | 1011_0010 | C3 Circuit Diagram |
| Tripler/Pump 1 | SWA, SWB, SWE, SWF, SWH | 1100_1101 | P3 Circuit Diagram |
| Tripler/Pump 2 | SWA, SWE, SWF | 1000_1100 | P3b Circuit Diagram |

Dead time periods 281, 282, 283, 284, 285, 286 illustrated in FIG. 2B are combinations of the dead time periods 140A-B, 142A-D illustrated in FIG. 2A. For example, the dead time period A (DTA) 281 between the idle state 180 of the buck mode 110 and the pump state 160 of the buck mode 110 is a combination of DT5 140A and DT6 140B. This relationship is evident through the use of a double arrow to show that the dead time period (DTA) 281 can occur during the transition from idle 180 to pumping 160, and during the transition from pumping 160 to idle 180. Similarly, the other dead time periods can occur in two separate instances such that they are combinations of the dead time periods illustrated in FIG. 2A. For example: dead time period B (DTB) 282 in FIG. 2B is a combination of DT5 140A and DT4 142D shown in FIG. 2A;

dead time period C (DTC) 283 in FIG. 2B is a combination of DT4 142D and DT1 142A shown in FIG. 2A; dead time period D (DTD) 284 in FIG. 2B is a combination of DT1 142A and DT2 142B shown in FIG. 2A; and dead time period E (DTE) 285 in FIG. 2B is a combination of DT2 142B and DT3 142C shown in FIG. 2A. Dead time period F (DTF) 286 in FIG. 2B is equivalent to DT2 142B of FIG. 2A. These relationships are shown more clearly in Table 2 below.

TABLE 2

| Dead Time Period in FIG. 2B | Corresponding Dead Time Periods in FIG. 2A |
|---|---|
| DTA | DT5 and DT6 |
| DTB | DT5 and DT4 |
| DTC | DT4 and DT1 |
| DTD | DT1 and DT2 |

TABLE 2-continued

| Dead Time Period in FIG. 2B | Corresponding Dead Time Periods in FIG. 2A |
|---|---|
| DTE | DT2 and DT3 |
| DTF | DT2 |

The multi-mode charge pump 10 transitions between states and operational modes in response to actuation of switches by the controller 50. To transition the charge pump 10 to an idle state 180 of the buck mode 110, the controller actuates SWD 63 and SWE 64. Closing both switches grounds the bottom plate of CAP1 70 (grounded when SWE 64 closes) and the bottom plate of CAP2 75 (grounded when SWD 63 closes). In this Idle Circuit Diagram 250, each of the pumping switches 65, 66, 67 is open. Furthermore, during the idle state 180, no supply current or voltage 15 is provided to the charge pump 10 because SWA 60 remains open.

As shown in FIG. 2A, the charge pump 10 transitions from the idle state 180 to a dead time state (DT5) 140A upon receiving a low NOC1 140 signal and a low regulation signal 25. When NOC2 145 goes high, the charge pump 10 transitions to a pumping (P1) state 160 of the buck mode 110. The controller 50 carries out this transition by actuating switches SWA 60, SWD 63, SWE 64 and SWF 65 to close all four switches as illustrated in the P1 Circuit Diagram 252. When SWA 60 closes, currently can flow from the supply voltage 15 is applied to the charge pump output 204. When SWF 65 closes, the associated diode 80A is short circuited, and voltage is permitted to dump or transfer from CAP1 70 to the output node 204. The additional voltage at the output node 204 is then dumped onto or otherwise transferred to the storage capacitor 30.

The charge pump 10 remains in the pump state 160 of the buck mode 110 until the controller 50 either receives a high regulation signal 25 indicating the regulated voltage 55 exceeded a threshold, or a low NOC2 145 signal. If the controller 50 first receives a high regulation signal 25, then the charge pump 10 transitions back to DTA 281 (DT6 140B as shown in FIG. 2A), and then back to an idle state 180 of the buck mode 110. Once in the idle state 180, the charge pump 10 remains in the buck mode 110 and goes through the process of moving to DT5 140A and back to a pumping state 160. It should be appreciated that this process is iterative and that the charge pump 10 will remain in a buck mode 110 while it receives a high regulation signal 25 during the pumping state 160.

If, however, the controller 50 first receives a low NOC2 145 signal while in the pumping state 160 of the buck mode 110, then the controller 50 transitions the charge pump 10 to DTB 282 (or DT4 142D as shown in FIG. 2A). This transition to DTB 282 further transitions the charge pump 110 into the doubler mode 120. Once in dead time period DTB 282, the charge pump 10 waits for a high NOC1 140 signal and upon receiving the high NOC1 signal, transitions the charge pump 10 to a charging state 170, in the doubler mode 120. This transition is effectuated when the controller 50 actuates switches SWA 60, SWD 63, SWE 64 and SWF 65 to close all four switches as illustrated in the C2 Circuit Diagram 254. As was the case in the pumping state 160 of the buck mode 110, in the charging state 170 of the doubler mode 120, voltage is permitted to transfer from CAP1 70 to the output node 206 where it is transferred to the storage capacitor 30, and the supply voltage 15 is applied to the flying capacitors 70, 75 to charge each capacitor 70, 75. The charging state 170 of the doubler mode 120 can operate to charge CAP2 75 to a voltage threshold such as $V_{Charge}$.

While in the charging state 170 of the doubler mode 120, if the controller 50 receives a high regulation signal 25 before it receives a low NOC1 140 signal, the controller will open switches SWA 60, SWD 63, SWE 64, and SWF 65 and move the charge pump 10 to DTB 282 (DT5 140A) to transition the charge pump 10 back to a buck mode 110. Upon receiving a high NOC2 145 signal, the controller 50 then transitions the charge pump 10 to a pumping state 160 of the buck mode 110. Moving from the charging state 170 of the doubler mode 120 to the pumping state 160 of the buck mode 110 in response to a high regulation signal 25, permits the charge pump 10 to maintain a regulated voltage 55 when an overvoltage regulation signal 25 is detected. Rather than increase the regulated voltage 55 beyond a threshold or what is needed to supply a load with the voltage needed to actuate the switch, the charge pump 10 maintains the regulated voltage 55 below a voltage threshold.

If the controller 50 receives a low NOC1 140 signal before it receives an overvoltage regulation signal 25, then the controller 50 transitions the charge pump 10 to DTC 283 (DT1 142A) within the doubler mode 120. Upon receiving a high NOC2 145 signal, the controller 50 transitions the charge pump 10 from DTC 283 to a pumping state 162 of the doubler mode 120. Effectuating this transition requires the controller 50 to actuate SWA 60, SWB 61, SWE 64 and SWH 67 to close these switches as illustrated in the P2 Circuit Diagram 256. Actuating SWA 60 permits the supply voltage 15 to be applied to the charge pump 10, while actuating SWH 67 permits the potential stored on CAP2 75 to be dumped or otherwise transferred to the storage capacitor 30. When SWB 61 closes, the supply voltage 15 is applied to the bottom plate of CAP2 75 to further charge CAP2 75, while closing SWE 64 grounds the bottom plate of CAP1 70.

When in the pumping state 162 of the doubler mode 120, the potential of the bottom plate of CAP2 75 is lifted to the level of the supply voltage 15. The top plate of CAP2 75 already has a potential of $V_{Charge}$, so the total output of CAP2 75 in the pumping state 162 is $V_{Charge}$ plus the supply voltage (VBB) 15. Internal clamping can prevent $V_{Charge}$ from exceeding a maximum threshold. When $V_{Charge}$ remains below this maximum threshold, VBB equals or is substantially equal to $V_{Charge}$, and the voltage across CAP2 75 can be twice or double VBB 15 (2VBB).

While in the pumping state 162 of the doubler mode 120, if the controller 50 receives an overvoltage regulation signal 25, then the controller 50 will open switches SWA 60, SWB 61, SWE 64, and SWH 67 and transition the charge pump 10 to the charging state 170 of the doubler 120. It should be appreciated that this process is iterative and that the charge pump 10 will remain in a doubler mode 120 while it receives a high regulation signal 25 during the pumping state 162. Furthermore, as stated above, if while cycling through the doubler mode 120 states, and during the charging state 170 of the doubler mode 120, the charge pump 10 receives another overvoltage regulation signal 25, then the charge pump 10 will transition back to the buck mode 110.

If while in the pumping state 162 of the doubler mode 120, the controller 50 receives a low NOC2 145 signal, then the controller 50 will transition the charge pump 10 to DTD 284 (DT2 142B) thus transitioning the charge pump 10 into a tripler mode 130. While in DTD 284, and upon receiving a high NOC1 140 signal, the controller 50 can transition the charge pump 10 into a charging state 175 of the tripler mode 130. Effectuating this transition requires the controller 50 to actuate SWA 60, SWC 62, SWD 63, SWG 66 to close these switches as illustrated in the C3 Circuit Diagram 258. Actuating SWA 60 permits the supply voltage 15 to be applied to the charge pump 10, while actuating SWG 66 permits the potential stored on CAP1 70 to be dumped or otherwise transferred to the top plate of CAP2 75. When SWC 62 is actuated, the supply voltage 15 is applied to the bottom plate of CAP1 70 to further charge CAP1 70, while closing SWD 63 grounds the bottom plate of CAP2 75. During the charging state 175 of the tripler mode 130, CAP2 75 is grounded and CAP1 70 is permitted to dump or transfer charge onto the top plate of CAP2 75 while receiving charge via the connection between CAP1's bottom plate and the supply voltage 15. Thus, the top of CAP2 75 is at a potential of 2VBB.

While in the charging state 175 of the tripler mode 130, the controller 50 transitions the charge pump 10 to DTE 285 (DT3 142C) upon receiving a low NOC1 140 signal. After the dead time 285, the controller 50 then transitions the charge pump 10 to a first pumping state 164 of the tripler mode 130 upon receiving a high NOC2 145 signal.

Transitioning to a first pumping state 164 of the tripler mode 130 requires the controller 50 to actuate or close SWA 60, SWB 61, SWE 64, SWF 65 and SWH 67 as illustrated in the P3 Circuit Diagram 260. When SWA 60 closes, the supply voltage 15 is applied to the charge pump 10. Closing SWF 65 permits the top plate of CAP1 70 to be coupled to and therefore charged by the supply voltage 15. Closing SWE 64 grounds the bottom plate of CAP1 70 so that all charge is stored on the top plate of CAP1 70. Closing SWB 61 causes the bottom plate of CAP2 75 to be connected to the supply voltage 15, while closing SWH 67 causes charge from CAP2 75 to be transferred to the storage capacitor 30. When the charge pump 10 enters the first pumping state 164, CAP2 75 already has a potential of 2VBB. When the bottom plate of CAP2 75 is connected to the supply voltage 15, the bottom plate of CAP2 75 has an additional potential equal to the supply voltage (VBB) 15. Thus, in the first pumping state 164, CAP2 75 is at a potential equal to triple or three times the supply voltage 15, i.e. 3VBB.

If the charge pump 10 receives an overvoltage regulation signal 25 while in the first pumping state 164, and before receiving a low NOC2 145 signal, the controller 50 will transition the charge pump 10 into a second pumping state 166 of the tripler mode 130. The controller 50 actuates switches SWA 60, SWE 64, and SWF 65 to transition the charge pump 10 to the second pumping state 166, as illustrated in the P3*b* Circuit Diagram 262. Closing SWA 60 causes the supply voltage 15 to be applied to the charge pump 10, while closing SWE 64 causes the bottom plate of CAP1 70 to be grounded. Closing SWF 65 permits the supply voltage 15 to be coupled to the top plate of CAP1 70. In this configuration, the bottom plate of CAP2 75 is floating. The second pumping state 166 of the tripler mode 130 functions as a type of idle state that the charge pump 10 enters when it encounters an overvoltage regulation signal 25. During this state, floating CAP2 75 discharges to the storage capacitor 30 or load, while CAP1 70 maintains or increases its charge. This second pumping state 166 is temporary and when the controller 50 receives a low NOC2 145 signal, the controller 50 transitions the charge pump to DTF 286 (DT2 142B) and then to the charging state 175 of the tripler mode 130 after the controller 50 receives a high NOC1 140 signal. It should be appreciated that this process is iterative and that the charge pump 10 will remain in a tripler mode 130 while it receives a high regulation signal 25 during the first pumping state 164. Furthermore, as stated above, if while cycling through the tripler mode 130 states, and during the charging state 175 of the tripler mode 130, the charge pump 10 receives another high overvoltage regulation signal 25, then the charge pump 10 will transition back to the doubler mode 120.

Consideration of the state diagram and associated circuit configurations reveals that a plate of each flying capacitor 70, 75 is grounded at least once during each operational mode. This arrangement can advantageously minimize substrate injection.

Figure 2C:
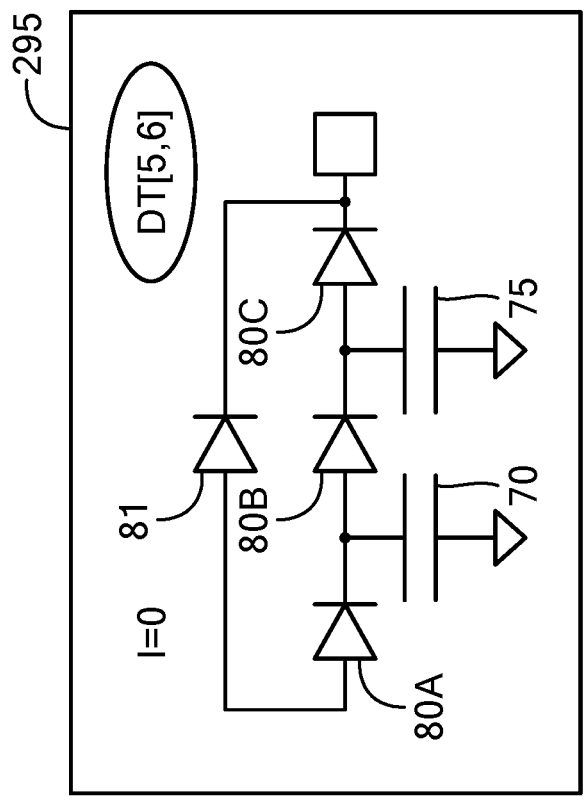
Figure 2C:
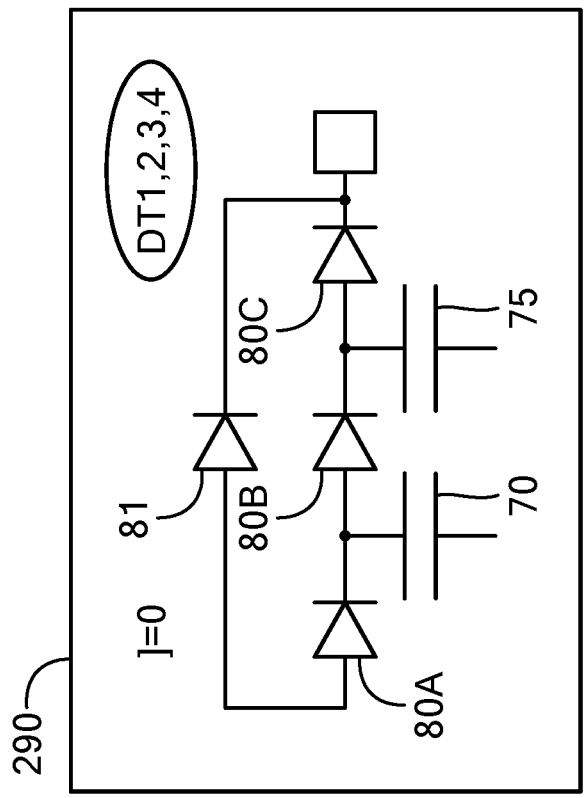

FIG. 2C illustrates the circuit configuration and thus, current path through the charge pump circuit 10 during each of the dead times 140A-B, 142A-D. The dead times are demonstrated in FIGS. 2A and 2B as segments of time between the operational modes. During a dead time, the configuration of the charge pump 10 can be shown by circuit diagrams 290, 295 illustrated in FIG. 2C. During DT1 142A, DT2 142B, DT3 142C and DT4 142D, the current through the charge pump 10 follows the path illustrated in the first dead time circuit diagram 290. During DT5 140A and DT6 140B, the current through the charge pump 10 follows the path illustrated in the second dead time circuit diagram 295. In the first circuit diagram 290, CAP1 70 and CAP2 75 are floating to permit the capacitors 70, 75 to discharge to the storage capacitor 30 or load. In the second circuit diagram 295, CAP1 70 and CAP2 75 are grounded such that both capacitors 70, 75 retain their charge.

Figure 3:
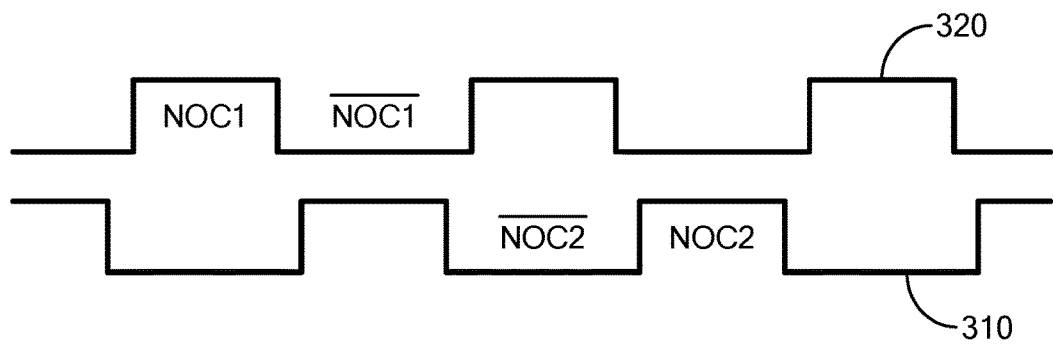
FIG. 3 illustrates a timing diagram showing clock signals.

FIG. 3 illustrates example clock signals for clock 1 (NOC1) 320 and clock 2 (NOC2) 310. As shown, when NOC1 320 is high, NOC2 310 is low, and when NOC1 320 is low, NOC2 310 is high. This graph illustrates the non-overlapping clock signals from clock 1 and clock 2.

FIG. 4 illustrates a current source 400 controlled by switch A (SWA) 60 and comprising one or more transistors 420, 430, an amplifier 440 and a switch 450. In some instances, the transistors 420, 430 can be bipolar junction transistors. The components of the current source 400 operate to current control actuation or operation of SWA 60.

When the switch 450 is closed, current through each of the transistors 420, 430 can be substantially equal such that $I_A = I_B$. It should be appreciated that the voltage between the base and emitter ($V_{BE}$) of a bipolar junction transistor can be represented as $$VBE = VT * \ln\left(\frac{I}{Is}\right).$$

When the transistor on the left (TA) 420 has an area that is n times larger than the area of the transistor on the right (TB) 430, $V_{BE}$ can be found using the following equation $$VBE = VT * \ln\left(\frac{I}{n * Is}\right).$$

The $V_{BE}$ of TA 420 is therefore lower than the $V_{BE}$ of the TB 430, and the difference in the two voltages is equal to the voltage across the resistor 410, i.e. $V_R = I_{SWA} * R$. When $V_R$ is equal to $V_{BE}$, the circuit is then in equilibrium and the current can be represented by $I = V_{Transistor} * \ln(n)/R$, and can be controlled because the emitters of the transistors 420, 430 are sensed and put in a feedback look with the amplifier 440 which drives SWA 60. The current limit increases when current in TB increases.

It should be appreciated that the circuit architectures and methods described herein are merely embodiments of the multi-mode charge pump, and that aspects of the multi-mode charge pump can be modified while maintaining the function of the multi-mode charge pump. All publications and references cited herein are expressly incorporated by reference in their entirety.

What is claimed is:

1. A multi-mode charge pump for generating a regulated voltage at an output node from a battery, comprising:
    a plurality of flying capacitors;
    a plurality of switches, each coupled to at least one of the flying capacitors, wherein the plurality of switches is configured to selectively couple the flying capacitors to the battery, to the output node or to a reference potential;
    a storage capacitor selectively coupled to one or more of the flying capacitors, wherein the regulated voltage is provided across the storage capacitor;
    a comparator having a first input coupled to receive the regulated voltage, a second input coupled to receive a reference voltage, and an output providing an asynchronous regulation signal; and
    a controller configured to automatically transition between operational modes of the multi-mode charge pump by controlling actuation of the plurality of switches in response to the asynchronous regulation signal, wherein the operational mode is selected from a buck mode, a doubler mode, and a tripler mode.

2. The multi-mode charge pump of claim 1, wherein the buck mode comprises an idle state and a pump state.

3. The multi-mode charge pump of claim 2, wherein each of the doubler mode and the tripler mode comprises a charge state and a pump state.

4. The multi-mode charge pump of claim 3, wherein the controller comprises a state machine having a plurality of states corresponding to the idle state of the buck mode, the pump state of the buck mode, the charge state of the doubler mode, the pump state of the doubler mode, the charge state of the tripler mode, the pump state of the tripler mode, and a dead time between the operational modes.

5. The multi-mode charge pump of claim 1, further comprising two non-overlapping clock signals coupled to the controller, wherein the controller is further configured to control actuation of the plurality of switches in response to the non-overlapping clock signals.

6. The multi-mode charge pump of claim 5, wherein a first one of the non-overlapping clock signals causes the state machine to enter a charge state and a second one of the non-overlapping clock signals causes the state machine to enter a pump state.

7. The multi-mode charge pump of claim 1, wherein a level of the regulated voltage is based in part on a load current of a load coupled to receive the regulated voltage and a level of a voltage of the battery.

8. The multi-mode charge pump of claim 1, further comprising a current limited current source coupled to a first switch of the plurality of switches and to the battery.

9. The multi-mode charge pump of claim 8, wherein, when the multi-mode charge pump is in the buck mode, the controller is configured to actuate the first switch to route current from the battery to the output node.

10. The multi-mode charge pump of claim 1, wherein, during a charge state of the doubler mode, the controller actuates the plurality of switches to couple a first plate of each of the flying capacitors to the battery and to the output node and to couple a second plate of each of the flying capacitors to the reference potential; and during a pump state of the doubler mode, the controller actuates the plurality of switches to couple a first plate of each of the flying capacitors to the battery and to the output node and to couple a second plate of at least one of the flying capacitors to the battery.

11. The multi-mode charge pump of claim 1, wherein, during a charge state of the tripler mode, the controller actuates the plurality of switches to couple a first plate of each of the flying capacitors to the battery and to the output node and to couple a second plate of a first one of the flying capacitors to the battery; and during a pump state of the tripler mode, the controller actuates the plurality of switches to couple a first plate of each of the flying capacitors to the battery and to the output node and to couple a second plate of a second one of the flying capacitors to the battery, wherein the first flying capacitor is different from the second flying capacitor.

12. The multi-mode charge pump of claim 4, wherein the state machine is configured to prevent the operational mode from changing directly from the buck mode to the tripler mode and also to prevent the operational mode from changing directly from the tripler mode to the buck mode.

13. The multi-mode charge pump of claim 1, wherein a plate of each of the flying capacitors is coupled to the reference potential at least once during each operational mode.

14. A method for generating a regulated voltage at an output node from a battery, the method comprising:

coupling, by a plurality of switches in a multi-mode charge pump, one or more of a plurality of flying capacitors to the battery, the output node or a reference potential;

providing the regulated voltage across a storage capacitor coupled to at least one of the flying capacitors;

receiving, by a comparator, the regulated voltage at a first input coupled to the storage capacitor;

outputting, by the comparator, an asynchronous signal generated by comparing the regulated voltage to a reference voltage coupled to a second input of the comparator;

receiving, by a controller, the asynchronous signal; and actuating, by the controller in response to the asynchronous signal, the plurality of switches to transition between operational modes of the multi-mode charge pump, wherein the operational mode is selected from a buck mode, a doubler mode, and a tripler mode.

15. The method of claim 14, wherein actuating further comprises actuating according to a state machine of the controller, wherein the state machine has a plurality of states corresponding to an idle state of the buck mode, a pump state of the buck mode, a charge state of the doubler mode, a pump state of the doubler mode, a charge state of the tripler mode, a pump state of the tripler mode, and a dead time between the operational modes.

16. The method of claim 14, wherein actuating further comprises actuating in response to at least one of two non-overlapping clock signals.

17. The method of claim 15, further comprising:

actuating, by the controller during the charge state of the doubler mode, the plurality of switches to couple a first plate of each of the flying capacitors to the battery and to the output node and to couple a second plate of each of the flying capacitors to the reference potential; and actuating, by the controller during a pump state of the doubler mode, the plurality of switches to couple a first plate of each of the flying capacitors to the battery and to the output node and to couple a second plate of at least one of the flying capacitors to the battery.

18. The method of claim 15, further comprising:

actuating, by the controller during a charge state of the tripler mode, the plurality of switches to couple a first plate of each of the flying capacitors to the battery and to the output node and to couple a second plate of a first one of the flying capacitors to the battery; and actuating, by the controller during a pump state of the tripler mode, the plurality of switches to couple a first plate of each of the flying capacitors to the battery and to the output node and to couple a second plate of a second one of the flying capacitors to the battery, wherein the first flying capacitor is different from the second flying capacitor.

19. A multi-mode charge pump for generating a regulated voltage at an output node from a battery, the multi-mode charge pump comprising:

means for coupling one or more of a plurality of flying capacitors to the battery, the output node or a reference potential;

means for providing the regulated voltage across a storage capacitor coupled to at least one of the flying capacitors;

means for comparing the regulated voltage to a reference voltage to generate an asynchronous signal; and means for selectively actuating the coupling means to cause the multi-mode charge pump to transition between operational modes selected from a buck mode, a doubler mode, and a tripler mode in response to the asynchronous signal.

20. The multi-mode charge pump of claim 19, wherein means for actuating further comprises means for actuating according to a state machine having a plurality of states corresponding to an idle state of the buck mode, a pump state of the buck mode, a charge state of the doubler mode, a pump state of the doubler mode, a charge state of the tripler mode, a pump state of the tripler mode, and a dead time between the operational modes.

* * * * *

UNITED STATES PATENT AND TRADEMARK OFFICE
CERTIFICATE OF CORRECTION

PATENT NO. : 10,483,846 B1  
APPLICATION NO. : 16/426444  
DATED : November 19, 2019  
INVENTOR(S) : Gianluca Allegrini et al.

Page 1 of 1

It is certified that error appears in the above-identified patent and that said Letters Patent is hereby corrected as shown below:

In the Specification

Column 1, Line 22 delete "can," and replace with --can--.

Column 10, Line 29 delete "currently" and replace with --currents--.

Signed and Sealed this  
Eighteenth Day of August, 2020

Andrei Iancu  
*Director of the United States Patent and Trademark Office*